United States Patent [19]

Arakawa

[11] Patent Number: 5,189,538
[45] Date of Patent: Feb. 23, 1993

[54] LIQUID CRYSTAL DISPLAY HAVING POSITIVE AND NEGATIVE BIREFRINGENT COMPENSATOR FILMS

[75] Inventor: Kohei Arakawa, Kanagawa, Japan

[73] Assignee: Fuji Photo Film Co., Ltd., Kanagawa, Japan

[21] Appl. No.: 431,500

[22] Filed: Nov. 3, 1989

[30] Foreign Application Priority Data

Nov. 4, 1988 [JP] Japan .................................. 63-278592
Dec. 14, 1988 [JP] Japan .................................. 63-315743
Sep. 12, 1989 [JP] Japan .................................. 1-236493

[51] Int. Cl.⁵ ........................ G02F 1/133; G02F 1/137
[52] U.S. Cl. ........................................ 359/73; 359/63; 359/93
[58] Field of Search ............... 350/347 E, 347 R, 335, 350/339 R, 346, 341

[56] References Cited

U.S. PATENT DOCUMENTS

| | | | |
|---|---|---|---|
| 4,385,806 | 5/1983 | Fergason | 350/347 R |
| 4,544,583 | 10/1985 | Claussen et al. | 350/337 |
| 4,561,724 | 12/1985 | Otaki et al. | 359/82 |
| 4,592,623 | 6/1986 | Yamamoto et al. | 350/337 |
| 4,629,637 | 12/1986 | Waldenrath et al. | 350/337 |
| 4,889,412 | 12/1989 | Clerc et al. | 350/347 E |
| 4,973,137 | 11/1990 | Kozaki | 350/347 R |
| 4,984,873 | 1/1991 | Takiguchi et al. | 350/337 |
| 5,056,896 | 10/1991 | Iimura et al. | 359/63 |
| 5,061,042 | 10/1991 | Nakamura et al. | 359/73 |
| 5,124,824 | 6/1992 | Kozaki et al. | 359/73 |

FOREIGN PATENT DOCUMENTS

| | | |
|---|---|---|
| 0246842 | 11/1987 | European Pat. Off. . |
| 0311339 | 4/1989 | European Pat. Off. . |
| 0393191 | 10/1990 | European Pat. Off. . |
| 0271429 | 11/1988 | Japan . |
| 219720 | 9/1989 | Japan . |
| 1462978 | 1/1977 | United Kingdom ............ 350/347 R |

OTHER PUBLICATIONS

Iimura et al., "STN LCD with Improved Viewing Angle Characteristics Using a Birefringent Film" SID8-9—Digest of Technical Papers-May 1989—pp. 398-401.

Primary Examiner—William L. Sikes
Assistant Examiner—Tai V. Duong
Attorney, Agent, or Firm—Sughrue, Mion, Zinn, Macpeak & Seas

[57] ABSTRACT

A liquid crystal display comprising a liquid crystal cell and a polarizing sheet is disclosed, in which (A) at least one film having light transmission properties, said film (A) having at least one optic axis at an angle of not more than 45° with the normal thereof or satisfying the relationship $$\eta_{TH} - (\eta_{MD} + \eta_{TD})/2 > 0$$

wherein $\eta_{TH}$ is a refractive index in the normal direction; $\eta_{MD}$ is a refractive index in the machine direction; and $\eta_{TD}$ is a refractive index in the transverse direction, and (B) at least one uniaxially stretched film of a polymer having a positive intrinsic birefringence and light transmission properties are inserted between the liquid crystal cell and the polarizing sheet. Viewing angle dependence of retardation of the display can be eliminated, and the display has markedly wide ended viewing angle.

5 Claims, 1 Drawing Sheet $n_{MD} \doteq n_{TD} < n_{TH}$

LIQUID CRYSTAL DISPLAY HAVING POSITIVE AND NEGATIVE BIREFRINGENT COMPENSATOR FILMS

FIELD OF THE INVENTION

This invention relates to a liquid crystal display using nematic liquid crystals, cholesteric liquid crystals or smectic liquid crystals.

BACKGROUND OF THE INVENTION

A liquid crystal display has been finding extended application because of many merits, such as possibility of direct connection to an IC circuit at low voltage and at low power, a wide variety of display functions, high productivity, and possibility of weight saving.

In some fields, however, a liquid crystal display is finding less application due to a limitation of display characteristics. The most serious problem attended by liquid crystal displays using nematic liquid crystals or cholesteric liquid crystals resides in coloring of a display screen and narrowness of the viewing angle.

With respect to coloring, removal of color is not only an essential requirement for color display, as a matter of course, but also a keen demand in monochromatic display, and hence a double-liquid crystal system has been proposed (e.g., JP-A-61-186973) (the term "JP-A" as used herein means an "unexamined published Japanese patent application"). However, since the double-liquid crystal system incurs an increased cost, attention has been called to utilization of a single phase difference film having birefringence properties which is obtained by stretching a polymer film.

The liquid crystal display using the phase difference film achieves color removal when seen from the direction vertical to the screen. However, when it is seen from an oblique direction, the disadvantage relating to viewing angle characteristics, i.e., coloring or disappearance of display with a slight change of viewing angle, becomes pronounced. This has been a great problem awaiting solution in using a phase difference film.

SUMMARY OF THE INVENTION

The inventors have conducted extensive studies to provide a novel liquid crystal display, eliminating the above-described problems associated with the phase difference film.

Taking notice of the fact that the problems stated above arise from viewing angle dependence of a retardation which is defined as a product of a birefringence and a film thickness, the inventors have studied on the assumption that dependence of a retardation on viewing angle would be eliminated by using more than one film so that the light path length in the film and the birefringence may be inversely proportional to each other with change of viewing angle. As a result, they ascertained that viewing angle dependence of a liquid crystal display can be removed almost completely by inserting at least one film having an optic axis substantially in the normal direction thereof and exhibiting light transmission properties and a uniaxially stretched polymer film having a positive intrinsic birefringence and exhibiting light transmission properties between a liquid crystal cell and a polarizing sheet, thus reaching the present invention.

That is, the present invention provides:

(1) a liquid crystal display comprising a liquid crystal cell and a polarizing sheet having inserted therebetween (A) at least one film having light transmission properties, said film (A) having at least one optic axis at an angle of not more than 45°, preferably not more than 20°, more preferably not more than 10°, and most preferably not more than 5°, with the normal thereof or satisfying the relationship:

$$\eta_{TH} - (\eta_{MD} + \eta_{TD})/2 > 0$$

wherein $\eta_{TH}$ is a refractive index in the normal direction; $\eta_{MD}$ is a refractive index in the machine direction; and $\eta_{TD}$ is a refractive index in the transverse direction (in this relationship, $\eta_{TH} > \eta_{MD} \approx \eta_{TD}$ being preferred, such as shown in FIG. 2), and (B) least one uniaxially stretched film of a polymer having a positive intrinsic birefringence and light transmission properties;

(2) a liquid crystal display as described in (1) above, wherein film (A) is a film in which molecules having a negative intrinsic birefringence are substantially orientated in the planar direction;

(3) a liquid crystal display as described in (1) or (2) above, wherein film (A) is a biaxially orientated film of a polymer having a negative intrinsic birefringence;

(4) a liquid crystal display as described in (1) or (2) above, wherein film (A) is composed of two uniaxially orientated films of a polymer having a negative intrinsic birefringence with the directions of orientation of the two films being at right angles, (5) a liquid crystal display as described in (1) or (2) above, wherein film (A) is a solvent-cast film of a polymer having a negative intrinsic birefringence;

(6) a liquid crystal display as described in (1) or (2) above, wherein film (A) is a film in which liquid crystal molecules having a negative intrinsic birefringence are orientated in the planar direction;

(7) a liquid crystal display as described in any of (1) through (5) above, wherein film (A) is a film obtained from one of styrene polymers or one of acrylate polymers;

(8) a liquid crystal display as described in (1) above, wherein film (A) is a film in which molecules having a positive intrinsic birefringence are substantially orientated in the normal direction thereof;

(9) a liquid crystal display as described in (1) or (8) above, wherein film (A) is a film in which liquid crystal molecules having a positive intrinsic birefringence are substantially orientated in the normal direction thereof;

(10) a liquid crystal display as described in any of (1) through (9) above, wherein at least one of films (A) is previously provided as a protective film on the polarizing sheet, on the side facing to the liquid crystal cell.

DETAILED DESCRIPTION OF THE INVENTION

Figure 1:
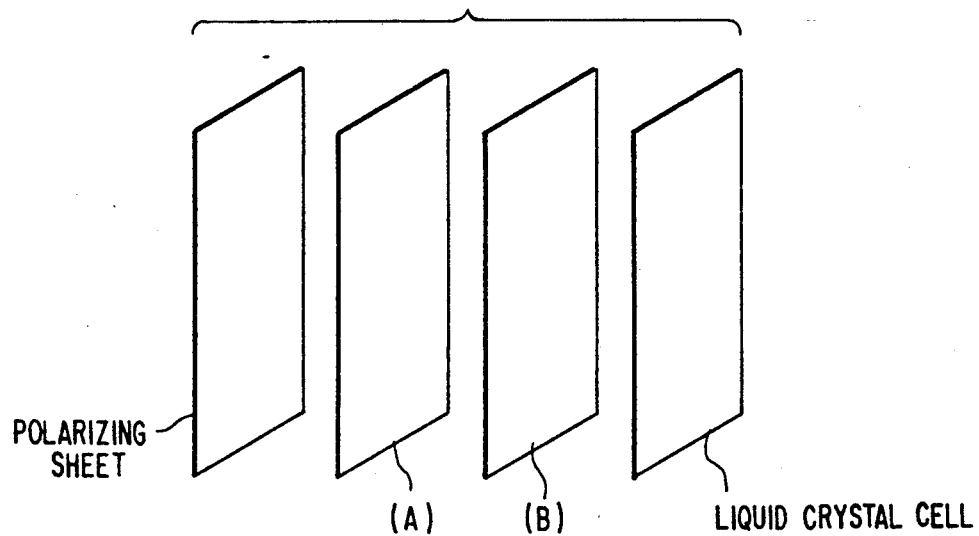
FIG. 1 is a schematic view of a liquid crystal display cell in accordance with one embodiment of the present invention.
Figure 2:
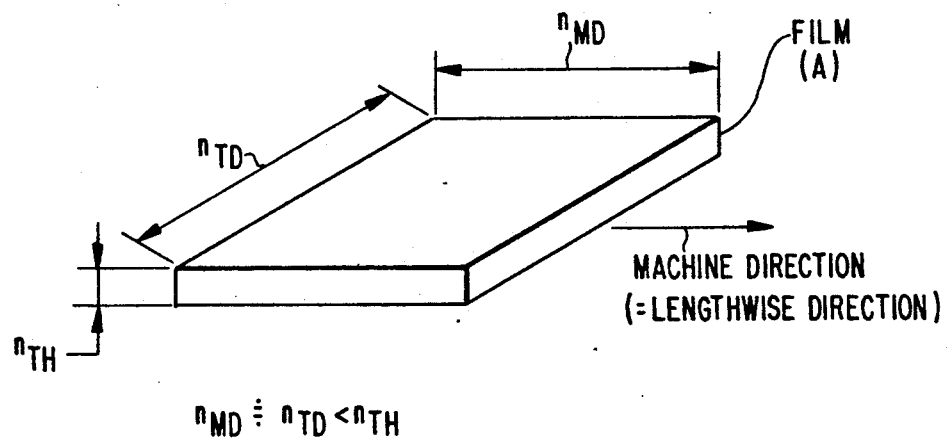
FIG. 2 is a perspective view of one embodiment of a film (A) used in a display device in accordance with the present invention.

In general, a birefringent film obtained by uniaxially stretching a polymer film having a positive intrinsic birefringence has a birefringence which is nearly fixed without greatly depending on the angle of incidence or increased with the angle of incidence where an incident beam passes through a plane at right angles with the direction of stretching. The same can be applied even to a film having a negative intrinsic birefringence if it exhibits large form birefringence due to orientation and eventually shows positive birefringence. Thus, in the uniaxially stretched polymer film having a positive intrinsic birefringence, as the angle between the direction of incidence and the normal to the film surface increases, the light path length in the film increases accordingly thereby increasing a retardation to make the viewing angle narrower. Further, where an incident beam enters at an inclination from the direction of the normal toward the direction of stretching axis, since the molecules are aligned at random in the cross section at right angles with the stretching axis, the birefringence is drastically decreased with an increase of the angle between the incident beam and the normal. This being the case, a drastic decrease of retardation cannot be avoided also because of an increase of light path length in the film accompanying the increase of the inclination of the incident beam, also resulting in making the viewing angle narrower.

Film (A) according to the present invention, which has an optic axis perpendicular to the film surface, has a birefringence of approximately zero, i.e., a retardation of nearly zero, in the direction perpendicular to the surface and, therefore, it takes place birefringence properties with an inclined incident beam while varying its retardation. Any film whose optic axis is substantially perpendicular to the surface thereof will suffice for the purpose of the present invention. In more detail, any film having at least one optic axis within 45° from the normal direction of the surface thereof can be used in the present invention. Thus, a film whose retardation in the direction perpendicular to the surface is not zero is also included in film (A). Even though the optic axis is not within 45° from the normal direction, the film can be used as film (A) if the following relationship is satisfied:

$$\eta_{TH} - (\eta_{MD} + \eta_{TD})/2 > 0$$

wherein $\eta_{TD}$ is a refractive index in the normal direction; $\eta_{MD}$ is a refractive index in the machine direction; and $\eta_{TD}$ is a refractive index in the transverse direction.

It is surprising that when a monochromatic light beam enters into a laminate of film (A) and a uniaxially stretched polymer film (B) having a positive intrinsic birefringence at an incident angle inclined from the normal direction of the surface of film (A) toward the direction at right angles with the stretching axis of film (B), an increase of retardation attributed to an increase of light path length due to the inclination can be inhibited and maintained constant. When the incident light is inclined from the normal direction to the direction of stretching, a drastic decrease of retardation can be prevented and maintained constant. It was also confirmed that such a laminate exhibits a greatly widened viewing angle when incorporated into a liquid crystal display.

In greater detail, the present invention provides a liquid crystal display using twisted or supertwisted nematic liquid crystals, cholesteric liquid crystals or smectic liquid crystals and the like which is free from a coloring phenomenon arising from birefringence properties of the liquid crystal cell while exhibiting a widened viewing angle and an enlarged high contrast area. According to the present invention, a retardation in the direction perpendicular to the liquid crystal cell can be corrected with at least one uniaxially stretched polymer film having a positive intrinsic birefringence and light transmission properties. Besides, correction of a retardation in case of inclined incidence can be achieved by synergistic effects produced by a combination of the uniaxially stretched film (film (B)) and a film having an optic axis in the direction normal to the surface thereof (film (A)). The relative positional relationship in laminating films (A) and (B) is not particularly limited as long as these films are interposed between a liquid crystal cell and a polarizing sheet, such as shown in the embodiment illustrated in FIG. 1. Film (A) or (B) may be provided on either side of the liquid crystal cell. It is also acceptable that more than one film are provided so as to sandwich the liquid crystal layer therebetween. In order to ensure the effect of widening the viewing angle and also to realize cost reduction, it is beneficial to utilize one or both of (B) a stretched film having a positive intrinsic birefringence and (A) a film whose optic axis is in the normal direction which is obtained from a polymer having a negative intrinsic birefringence as a substitute for a protective film of the liquid crystal side of the polarizing sheet.

The term "film" as used herein embraces not only a film in a common sense but also a coated film provided on a support.

The term "uniaxially stretched film" as used herein includes not only a film stretched in one direction in a strict sense but a film exhibiting biaxial orientation. That is, the term means a film exhibiting birefringence properties attributed to anisotropism in molecular alignment and thus functioning to compensate for a phase difference in at least the direction perpendicular to the liquid crystal cell. Hence, the method of stretching is not restricted at all, including a transverse stretching method by tentering, a longitudinal stretching method using a difference in peripheral speed of stretching rolls (shrinkage in the width direction, i.e., necking, is sometimes permitted and sometimes limited), and a biaxial stretching method with or without a difference in stretch ratio between two directions at right angles. Preferred of these methods are longitudinal uniaxial stretching at a roll distance/film width ratio of 3 or more, preferably 5 or more, with a permissive necking of 10% or more, and transverse uniaxial stretching by tentering. In longitudinal uniaxial stretching utilizing a difference in peripheral speed of rolls, if the distance between two rolls is small, the film is apt to undergo uneven stretching as is well known in the case of stretching polyvinyl alcohol (PVA) to be used as a polarizing sheet. Further, extreme limitation on necking possibly leads to slight reduction of the compensating effect of film (A) having its optic axis in the normal direction.

The polymer having a positive intrinsic birefringence (preferably 0.02 or more preferably 0.05 or more) which corrects retardation of the liquid crystal cell preferably has a light transmittance of at least 70%, preferably at least 90%, more preferably at least 95%. While not a particular limitation, examples of suitable polymers are polycarbonate, polyarylate, polyethylene terephthalate, polyether sulfone, polyphenylene sulfide, polyphenylene oxide, polyallyl sulfone, polyamide-imide, polyimide, polyolefin, polyacrylonitrile, cellulose, and polyester, with polycarbonate type polymers being particularly preferred.

Also included in the polymer materials are those whose intrinsic birefringence is negative but small enough so that form birefringence due to stretching may be well over that and, as a result, becomes positive. In addition, the polymer materials herein referred to include not only homopolymers but copolymers, polymer derivatives, and polymer blends.

The polymer having a negative intrinsic birefringence (preferably −0.01 or less, more preferably −0.05 or less, most preferably −0.1 or less) which can be used in the present invention is not particularly limited. Examples of suitable polymers are styrene polymers, acrylate polymers, methacrylate polymers, acrylonitrile polymers, and methacrylonitrile polymers. These polymers include not only homopolymers but copolymers, polymer derivatives, and polymer blends. From the standpoint of a large absolute value of intrinsic birefringence and excellent transparency, styrene polymers are particularly preferred.

The styrene polymers herein referred to include homopolymers of styrene or a styrene derivative, copolymers of styrene or a styrene derivative, and blends thereof.

Specific examples of the styrene derivative are alpha-methylstyrene, o-methylstyrene, p-methylstyrene, p-chlorostyrene, p-phenylstyrene, and 2,5-dichlorostyrene. The copolymers of styrene or a styrene derivative (hereinafter inclusively referred to as ST) or blended polymers are not particularly restricted as far as they have satisfactory film-forming properties, transparency, water resistance, heat resistance, clear cut properties, and workability. Examples of the copolymers are ST/acrylonitrile, ST/methacrylonitrile, ST/methyl methacrylate, ST/ethyl methacrylate, ST/α-chloroacrylonitrile, ST/methyl acrylate, ST/ethyl acrylate, ST/butyl acrylate, ST/acrylic acid, ST/methacrylic acid, ST/butadiene, ST/isoprene, ST/maleic anhydride, ST/vinyl acetate, and styrene/styrene derivative copolymers. In addition to these copolymers, terpolymers or higher order polymers are employable as well. The polymer blends include blends of polymers selected from the above-described styrene homopolymer, styrene derivative homopolymers, and styrene/styrene derivative copolymers and, in addition, blends of a polymer comprising styrene and/or a styrene derivative (hereinafter referred to as PST) and a polymer containing no PST. Specific example of the polymer blend include a PST/butyl cellulose blend and a PST/coumarone resin blend.

The terminology "orientation in the planar direction or, simply, planar orientation of polymer" as used herein means that the film exhibits molecular alignment having an orientation parameter near to zero when seen from the direction perpendicular to the surface thereof and an orientation parameter greater than zero when seen from the cut surface thereof, the orientation parameter being defined by $\frac{1}{2}(3\cos^2 \theta - 1)$.

Such planar orientation takes place through shrinkage in the thickness direction during biaxial stretching or during solvent evaporation in film casting. A film having planar orientation has an optic axis substantially in the normal direction thereof and functions to widen the viewing angle when applied to a liquid crystal display. It has been found that a similar function can also be obtained by cross-laminating two uniaxially stretched films of a polymer having a negative intrinsic birefringence. In this case, the two uniaxially stretched films need not always be laid up in contact with each other, and the mode of provision is not limited. For example, a uniaxially stretched film having a positive intrinsic birefringence may be inserted between the two uniaxially stretched films. Of the above-described films having planar orientation, those formed from a polymer having a negative intrinsic birefringence and having been endowed with planar orientation through shrinkage in the thickness direction during solvent evaporation are preferred in view of their uniform planar molecular orientation and freedom from optical unevenness as compared with those obtained by forced stretching.

The film having its optic axis substantially in the normal direction thereof can also be obtained by orientating molecules having a positive intrinsic birefringence in the direction normal to the film surface. Orientation may be carried out by applying a high voltage to a polymer film through electrodes placed on both sides of the film during film formation by melt-extrusion. In this case, however, a high electric field of 20 MV/m or more is required, sometimes causing breakdown. Therefore, it is more advantageous to orientate a liquid crystal monomer and then to fix it afterward. For example, such can be done by a method in which a compound polymerizable on irradiation of ultraviolet rays, visible rays, etc. and a liquid crystal monomer are mixed and polymerization is conducted while maintaining orientation of the liquid crystal monomer in an electric field thereby fixing the orientation. The liquid crystal monomer per se may have photopolymerizability.

In short, the concept of the present invention consists in a combined use of film (A) having its optic axis substantially in the normal direction thereof with longitudinally uniaxially stretched film (B). The specific means to be involved are not, therefore, restricted.

The present invention is now illustrated in greater detail by way of the following Examples, but it should be understood that the present invention is not deemed to be limited thereto. Unless otherwise specified, all the percents, parts, and ratios are by weight in these Examples.

EXAMPLE 1

Polycarbonate obtained by condensation of phosgene and bisphenol A (molecular weight: 80,000; intrinsic birefringence: 0.104) was dissolved in methylene dichloride to form a 10% solution. The solution was cast on a steel-made drum and continuously stripped off to obtain a transparent polycarbonate film (hereinafter referred to as PC film) having a thickness of 90 μm and a width of 500 mm. The film was 33% stretched by tentering at 170° C. to obtain a phase difference film having a thickness of 68 μm and a retardation of 560 nm.

The resulting film was laminated on a biaxially stretched polystyrene film "GSS 15" (produced by Dainippon Ink & Chemicals, Inc.; thickness: 150 μm), and dependence of a retardation on viewing angle was determined with a birefringence meter "AEP-100" (manufactured by Shimazu Seisakusho Ltd.) using a monochromatic light beam of 632.8 nm. As a result, the retardation showed almost no dependence on the angle as shown in Table 1 below. Further, when the above-described film laminate was inserted between a super twisted nematic (STN) liquid crystal cell and a polarizing sheet of an analyzer side, the range of the viewing angle was greatly improved with little dependence on the order of laminating or the relative angle of laminating. Namely, the displayed image could be seen clearly at an inclined angle of 50° or more.

Refractive indices of the polystyrene film were measured with an Abbe refractometer to find $\eta_{TH}=1.555$, $\eta_{MD}=1.543$, and $\eta_{TD}=1.542$, giving a relationship:

$$\eta_{TH}-(\eta_{MD}+\eta_{TD})/2=0.0125>0.$$

COMPARATIVE EXAMPLE 1

Angle dependence of a retardation of the PC film as used in Example 1 (retardation: 560 nm) was determined in the same manner as in Example 1. The results obtained are shown in Table 1 below. When the PC film was combined with a liquid crystal cell, the viewing angle was 20° or less.

The refractive indices of the PC film were measured to find $\eta_{TH}-1.574$, $\eta_{MD}=1.591$, and $\eta_{TD}=1.582$, giving a relationship:

$$\eta_{TH}-(\eta_{MD}+\eta_{TD})/2=-0.125>0.$$

COMPARATIVE EXAMPLE 2

The optical characteristics of the biaxially stretched film GSS 15 as used in Example 1 were determined in the same manner as in Example 1. The results obtained are shown in Table 1 below. The retardation in the normal direction was close to zero so that the film when used alone could not correct the phase difference of the liquid crystals.

EXAMPLE 2

The PC film prepared in Example 1 was longitudinally stretched at a stretch ratio of 29% at a temperature of 170° C. using rollers having different peripheral speeds without fixing the both sides of the film. The distance between rolls was 5 m; the necking ratio was 13%; the film let-off speed was 2 m/min, and the film take-up speed was 2.6 m/min.

The resulting stretched film and a biaxially stretched polystyrene film "OPS-50" (produced by Mitsubishi Monsant Chemical Co., Ltd.) were laid up, and retardation of the laminated film was determined in the same manner as in Example 1. Dependence of the retardation on viewing angle was small.

When biaxially stretched polystyrene film was inserted between an STN liquid crystal cell and an analyzer with the above-obtained stretched PC film being used as a protective film of a polarizing sheet of an analyzer side on the side to the liquid cell, the viewing angle greatly increased, and the displayed image could be clearly seen even at an inclination of 50° C. or more.

The polystyrene film used had an $\eta_{TH}$ of 1.556, an $\eta_{MD}$ of 1.543, and an $\eta_{TD}$ of 1.542, giving a relationship:

$$\eta_{TH}-(\eta_{MD}+\eta_{TD})/2=0.0135>0.$$

COMPARATIVE EXAMPLE 3

Viewing angle dependence of the retardation of the PC film obtained in Example 2 was determined, and the results obtained are shown in Table 1 below.

When the film was used alone as a phase difference film, the viewing angle was 30° or less.

COMPARATIVE EXAMPLE 4

The optical characteristics of the biaxially stretched polystyrene film OPS-50 as used in Example 2 are shown in Table 1 below. Because the retardation in the normal direction was close to zero, it could not be used alone as a film for correcting the phase difference of liquid crystals.

EXAMPLE 3

Polystyrene "Denka Styrol MW-1" (produced by DENKI KAGAKU KOGYO K.K.) was dissolved in a 1:1 (by volume) mixture of toluene and methyl ethyl ketone to prepare a 10 wt % solution, and the solution was cast in the same manner as for the formation of the PC film in Example 1 to obtain a 100 μm thick polystyrene film. When two polystryrene films thus obtained and the same PC film as obtained in Example 2 were laminated and inserted between a liquid crystal cell and an analyzer, the displayed image was clear, and the viewing angle greatly increased. Further, since the planar orientation in the PC film was the one resulted from internal shrinkage in the thickness direction during solvent evaporation but not from biaxial stretching, the film was substantially free from optical unevenness corresponding to local unevenness of birefringence, providing a high quality image. The displayed image was clear even at an inclination of 50°, and the optical characteristics of the film laminate were satisfactory as shown in Table 1 below.

The polystyrene film had an $\eta_{TH}$ of 1.551, an $\eta_{MD}$ of 1.548, and an $\eta_{TD}$ of 1.548, giving a relationship:

$$\eta_{TH}-(\eta_{MD}\eta_{TD})/2=0.003>0.$$

COMPARATIVE EXAMPLE 5

The optical characteristics of the polystyrene film as obtained in Example 3 were as shown in Table 1 below. The polystyrene film, when used alone, could not correct the phase difference of an STN liquid crystal cell.

EXAMPLE 4

The polystryrene film as obtained in Example 3 was subjected to longitudinal uniaxial stretching at a stretch ratio of 100% at a temperature of 120° C. Two uniaxially stretched films thus obtained were inserted between an STN liquid crystal cell and an analyzer in such a manner that the stretching axes were at right angles. Further, the PC film obtained in Example 1 was inserted between the liquid crystal cell and a polarizing sheet. A clear image was displayed as a result. The optical characteristics of the film laminate comprising the crossing two polystryrene films and the PC film are shown in Table 1.

The polystyrene film had an $\eta_{TH}$ of 1.553, an $\eta_{MD}$ of 1.556, and an $\eta_{TD}$ of 1.539, giving a relationship:

$$\eta_{TH}-(\eta_{MD}+\eta_{TD})/2=0.0055>0.$$

COMPARATIVE EXAMPLE 6

The optical characteristics of the film laminate comprising the two uniaxially stretched polystyrene films whose stretching axes were at right angles are shown in Table 1 below. The film laminate, when used alone, could not remove coloring of an STN liquid crystal cell and was thus unsuitable as an optical compensator film.

EXAMPLE 5

Polyarylate "U-Polymer AX-1500" (produced by Sumitomo Chemical Co., Ltd.) was dissolved in methylene dichloride to prepare a 8% solution. The solution was cast on a steel-made drum and continuously stripped off to obtain a transparent polyarylate film having a thickness of 80 μm and a width of 500 mm.

The resulting film was subjected to longitudinal stretching at a stretch ratio of 35% at a temperature of 195° C. using rollers having different peripheral speeds without fixing the both sides thereof. The necking ratio was 11%, the roll distance was 3 m, and the film let-off speed was 4 m/min.

The resulting stretched film and two polystyrene films as obtained in Example 3 were laminated and inserted between an STN liquid crystal and an analyzer. The viewing angle range was greatly broadened, and the displayed image could be seen clearly even at an inclination of 40° or more. The optical characteristics of the film laminate are shown in Table 1 below.

COMPARATIVE EXAMPLE 7

The polyarylate film as obtained in Example 5 was used alone as a phase difference film. The viewing angle was 30° or less. The optical characteristics of this film are shown in Table 1 below.

observed when the uniaxially stretched film is used alone. The combination, when applied to a nematic, cholesteric or smectic liquid crystal cell as a phase difference film, considerably improves the viewing angle.

While the invention has been described in detail and with reference to specific embodiments thereof, it will be apparent to one skilled in the art that various changes and modifications can be made therein without departing from the spirit and scope thereof.

What is claimed is:

1. A liquid crystal display comprising a liquid crystal cell and a polarizing sheet having inserted therebetween at least one film having light transmission properties, said film (A) satisfying the relationship:

$$\eta_{TH} - (\eta_{MD} + \eta_{TD})/2 > 0$$

wherein $\eta_{TH}$ is the refractive index in the normal direction; $\eta_{MD}$ is the refractive index in the machine direction; and $\eta_{TD}$ is the refractive index in the transverse direction, and at least one uniaxially stretched film (B) of a polymer having a positive intrinsic birefringence and light transmission properties.

2. A liquid crystal display as claimed in claim 1, wherein said film (A) is a uniaxially oriented film or a biaxially orientated film of a polymer having a negative intrinsic birefringence.

3. A liquid crystal display as claimed in claim 1, wherein said film (A) is a film obtained from one of a

TABLE 1

| | | Angle Dependence of Retardation and Angle of Optic Axis | | | | |
|---|---|---|---|---|---|---|
| | | Angle of Inclined Incident Light | | | Retardation | Angle of Optic Axis |
| | Film | 0° | 20° | 40° | Ratio (40°/0°) | with Normal |
| Ex. 1 | α-direction | 562 | 563 | 569 | 1.01 | — |
| | β-direction | 562 | 560 | 562 | 1.00 | — |
| Ex. 2 | α-direction | 575 | 581 | 591 | 1.03 | — |
| | β-direction | 575 | 569 | 560 | 0.97 | — |
| Ex. 3 | α-direction | 569 | 572 | 604 | 1.06 | — |
| | β-direction | 569 | 565 | 535 | 0.94 | — |
| Ex. 4 | α-direction | 563 | 568 | 582 | 1.03 | — |
| | β-direction | 563 | 557 | 543 | 0.96 | — |
| Ex. 5 | α-direction | 582 | 587 | 615 | 1.06 | — |
| | β-direction | 583 | 577 | 554 | 0.95 | — |
| Comp. Ex. 1 | α-direction | 561 | 610 | 714 | 1.27 | — |
| | β-direction | 560 | 521 | 395 | 0.71 | — |
| Comp. Ex. 2 | α-direction | 15 | −18 | −122 | — | 10° |
| | β-direction | −13 | −48 | −153 | — | |
| Comp. Ex. 3 | α-direction | 569 | 582 | 627 | 1.10 | — |
| | β-direction | 568 | 556 | 513 | 0.90 | — |
| Comp. Ex. 4 | α-direction | 21 | 11 | −14 | — | 25° |
| | β-direction | −22 | −33 | −58 | — | |
| Comp. Ex. 5 | α-direction | 0 | −4 | −12 | — | 0° |
| | β-direction | 0 | −5 | −13 | — | |

COMPARATIVE EXAMPLE 8

An image was displayed using the STN liquid crystal cell as used in Examples 1 to 5 alone. The image obtained assumed reddish purple and, the viewing angle was as narrow as providing an unclear image at an inclination of 20° or more.

As described above, the combination of (A) a film having an optic axis substantially in the direction normal to the surface thereof or satisfying the relationship ($\eta_{TH} - (\eta_{MD} + \eta_{TD})/2 > 0$) and (B) a uniaxially stretched film of a polymer having a positive intrinsic birefringence brings about a marked improvement on viewing angle dependence of a retardation which is styrene polymers or one of acrylate polymers.

4. A liquid crystal display as claimed in claim 1, wherein at least one film (A) is previously provided as a protective film on the polarizing sheet on the side facing to the liquid crystal cell.

5. A liquid crystal display as claimed in claim 1, wherein said film (A) ia laminated on said film (B), and wherein the laminated film has a relationship of 0.95 < Retardation (40°/0°) < 1.06 in which Retardation (40°/0°) represents the ratio of Retardation when the incident light is at 40° to Retardation when the incident light is at 0°.

* * * * *